US010156003B2

(12) United States Patent
Pu et al.

(10) Patent No.: US 10,156,003 B2
(45) Date of Patent: Dec. 18, 2018

(54) METHOD OF EXTRACTING GERMANIUM FROM GERMANIUM DEPOSIT USING THERMAL REDUCTION PROCESS

(71) Applicants: YUNNAN LINCANG XINYUAN GERMANIUM INDUSTRY CO.,LTD, Kunming, Yunnan (CN); YUNNAN DONGCHANG METAL TECH CO.,LTD., Kunming, Yunnan (CN)

(72) Inventors: Shikun Pu, Kunming (CN); Wendong Bao, Kunming (CN); Decai Hu, Kunming (CN); Zhiguo Zhu, Kunming (CN); Tianmin Xie, Kunming (CN); Guangwen Li, Kunming (CN); Caiwei Yao, Kunming (CN); Kaihong Bao, Kunming (CN); Wangchang Wu, Kunming (CN); Zailei Yang, Kunming (CN); Gao Xie, Kunming (CN)

(73) Assignees: YUNNAN LINCANG XINYUAN GERMANIUM INDUSTRY CO.,LTD., Lincang, Yunnan (CN); YUNNAN DONGCHANG METAL TECH CO.,LTD., Kunming, Yunnan (CN)

( * ) Notice: Subject to any disclaimer, the term of this patent is extended or adjusted under 35 U.S.C. 154(b) by 122 days.

(21) Appl. No.: 15/103,001

(22) PCT Filed: May 7, 2015

(86) PCT No.: PCT/CN2015/078431
§ 371 (c)(1),
(2) Date: Jun. 9, 2016

(87) PCT Pub. No.: WO2016/176850
PCT Pub. Date: Nov. 10, 2016

(65) Prior Publication Data
US 2017/0121790 A1    May 4, 2017

(51) Int. Cl.
C22B 41/00 (2006.01)
C01G 17/00 (2006.01)
C01G 17/02 (2006.01)

(52) U.S. Cl.
CPC .............. *C22B 41/00* (2013.01); *C01G 17/00* (2013.01); *C01G 17/02* (2013.01); *Y02P 10/234* (2015.11)

(58) Field of Classification Search
CPC .................................................... C22B 41/00
(Continued)

(56) References Cited

U.S. PATENT DOCUMENTS 4,678,647 A    7/1987    Lisowyi et al.

FOREIGN PATENT DOCUMENTS

CN    101407864    4/2009
CN    101413063    4/2009
(Continued)

OTHER PUBLICATIONS

Machine translation of CN-203382811-U (Year: 2014).*
(Continued)

*Primary Examiner* — George Wyszomierski
*Assistant Examiner* — Tima M McGuthry-Banks
(74) *Attorney, Agent, or Firm* — Hamre, Schumann, Mueller & Larson, P.C.

(57) ABSTRACT

A method of extracting germanium from a germanium deposit using a thermal reduction process is disclosed. The method includes: adding sodium monophosphate to a germanium deposit to obtain a mixed germanium deposit; isolating the mixed germanium deposit from air; increasing the temperature and then baking the mixed germanium deposit; and obtaining a germanium concentrate after volatilization of the mixed germanium deposit.

1 Claim, 1 Drawing Sheet

(58) Field of Classification Search
USPC .................................................... 423/96, 98
See application file for complete search history.

(56) References Cited

FOREIGN PATENT DOCUMENTS

| | | | |
|---|---|---|---|
| CN | 101831563 | | 9/2010 |
| CN | 102719679 B | * | 7/2013 |
| CN | 103334011 A | * | 10/2013 |
| CN | 203382811 | | 1/2014 |
| CN | 203382811 U | * | 1/2014 |
| CN | 103952575 | | 7/2014 |
| CN | 104480328 B | | 4/2015 |

OTHER PUBLICATIONS

Machine translation of CN-103334011-B (Year: 2013).*
Machine translation of CN-102719679-B (Year: 2013).*
International Search Report for International Application No. PCT/CN2015/078431 dated Jan. 22, 2016 (8 pages including English Translation).
Witten Opinion for International Application No. PCT/CN2015/078431 dated Jan. 22, 2016 (5 pages including English Translation).

* cited by examiner

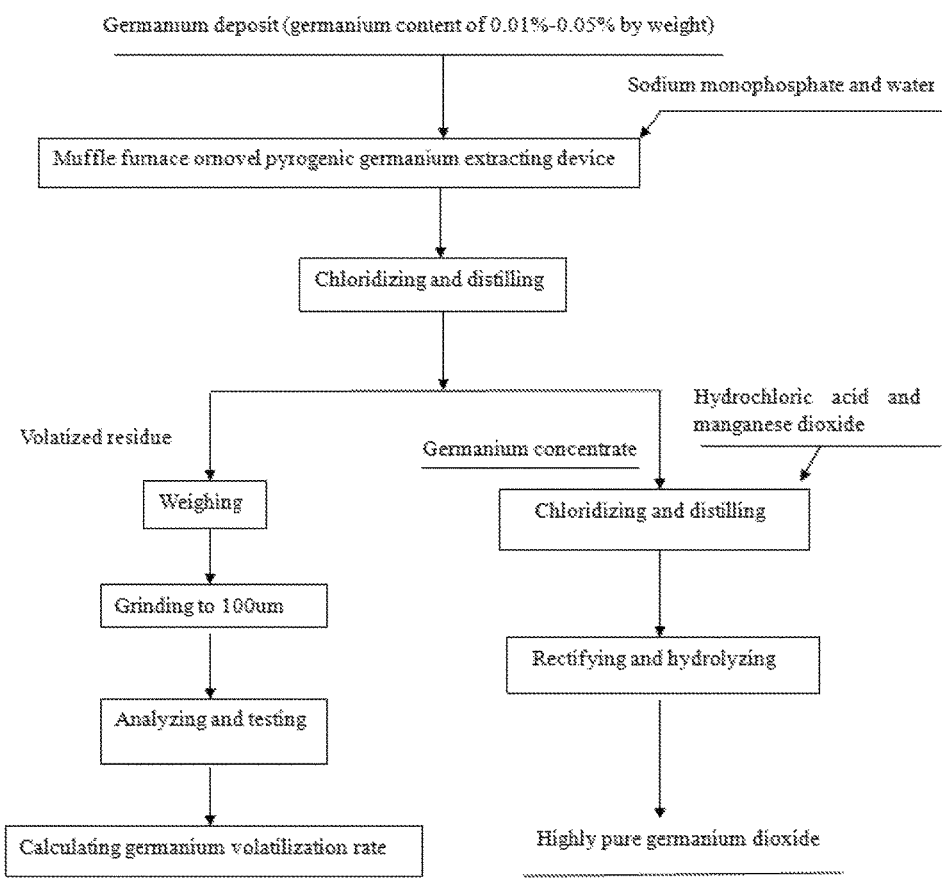

METHOD OF EXTRACTING GERMANIUM FROM GERMANIUM DEPOSIT USING THERMAL REDUCTION PROCESS

TECHNICAL FIELD

The present disclosure relates to a method of extracting germanium, which belongs to metallurgical technologies for nonferrous metal, and particularly relates to a method of extracting germanium from a germanium deposit through thermal reduction, volatilization and concentration using sodium monophosphate as a reducing agent.

BACKGROUND ARTS

Lignite is a useful carrier for concentrated germanium, as it includes many organic substances that can fix germanium. Lignite in Bangmai Basin, Lincang City of Yunnan province in southwest China is a main global source of germanium. The lignite there has poor quality as coal since its calorific value is just 30%-40% compared with that of ordinary lignite, but it contains relatively higher contents of germanium which has higher values. Therefore, the Chinese Ministry of Land Resources approved to change the lignite mine into a germanium mine. The germanium mine there boasts a germanium reserve of around 800 tons and is now exploited by Yunnan LincangXinyuan Germanium Co. Ltd. The main method used for extracting germanium is concentration through pyrogenic combustion. Specifically, under high temperatures, a reducing gas generated by carbon reduces the germanium in the germanium deposit, and the reduced germanium volatizes into smog. However, the primary volatilization rate of germanium can hardly exceed 75%; the cost for secondary recycling of germanium from germanium residue is too high; and germanium resources are wasted. Therefore, there is a need to develop a method for effectively improving the germanium volatilization rate. There are many forms of germanium existing in lignite. High valence germanium compounds are stable in state, and can volatize obviously only under high temperatures, while low valence germanium compounds can volatize obviously at 800° C.-900° C. As carbon has a relatively strong reducing function under high temperatures, yet the carbon content in germanium deposits is low and cannot substantially promote volatilization of germanium, a more effective reducing agent needs to be added to promote volatilization of germanium.

Technical Problems

The present disclosure solves the following problems in the prior arts: existing pyrogenic methods for concentrating and extracting germanium from germanium deposits can hardly achieve a germanium recycling rate of greater than 75%; secondary pyrogenic recycling methods for extracting germanium slag have excessively high production cost and yield low germanium recycling rates; and the cost of hydrometallurgical treatment methods for low-grade germanium concentrates is too high.

Technical Solutions

Germanium exists in various complex forms of organic and inorganic compounds in germanium deposits. Among these complex compounds, most germanium exists in the form of stable $Ge^{4+}$, and a little germanium exists in the form of $Ge^{2+}$. Germanium in the form of $Ge^{4+}$ compounds can volatize obviously only at temperatures above 1,150° C., while germanium in the form of $Ge^{2+}$ compounds can volatize obviously at a temperature of 750° C. The pyrogenic process of concentrating volatized germanium employs the principle that carbon can reduce certain $Ge^{4+}$ compounds into $Ge^{2+}$ compounds under high temperatures so as to realize obvious volatilization of germanium. However, germanium exists in complex forms in germanium deposits, and reduction by carbon cannot enable volatilization of germanium to the largest extent. Therefore, reducing agents need to be added to increase the germanium volatilization rate, improve the grade of germanium concentrates, reduce the germanium content in the germanium slag, and avoid secondary treatment of germanium slag.

There are thousands of chemical reducing agents, which can be categorized into various types, including metal reducing agents (such as potassium, sodium, iron, zinc, magnesium and other active metals), low valence oxide reducing agents (such as CO, $Fe_2O_3$ and NO), hydride reducing agents (such as $H_2S$, $NH_3$ and $BH_3$), inorganic compound reducing agents (such as $NaBH_4$ and $KBH_4$), and organic compound reducing agents (such as formaldehyde and sodium ethoxide). Exploratory experiments are carried out for the experimental group considering the aspects of economy, safety and environmental friendliness. Several representative reducing agents are taken for selective experiments in the laboratory stage. The methods and steps for the experiments are the same, with a sampling amount of 5 g, a volatilization temperature of 1,000° C. and a reaction period of 1 hour. The comparison results are shown in Table 1.

Table 1 shows the germanium volatilization rates produced by several reducing agents.

| | Reducing agent | | | | | | | |
|---|---|---|---|---|---|---|---|---|
| | Not added | Coke | Iron powder | Zinc powder | $NaBH_4$ | $KBH_4$ | Formaldehyde | Sodium monophosphate |
| Proportion (wt %) added | — | 40 | 7.5 | 7.5 | 10.0 | 10.0 | 15.0 | 5.0 |
| Germanium volatilization rate (%) | 54.67 | 89.36 | 49.54 | 53.73 | 78.31 | 71.90 | 66.74 | 97.21 |

As shown by Table 1, the reducing effect produced by common industrial reducing agents falls far behind that of sodium monophosphate, which is a highly efficient reducing agent for reducing germanium. Considering the factors of safety, environmental friendliness, industrial production cost and reducing efficiency, sodium monophosphate is a suitable reducing agent for extracting germanium from germanium deposits by volatilization and concentration, as it can directly reduce high valence germanium into germanium monoxide, which promotes volatilization of germanium from germanium deposits. The reaction products of sodium monophosphate are sodium pyrophosphate and sodium metaphosphate, which are safe to the environment. Considering the factors of safety, environmental friendliness, industrial production cost and reducing efficiency, productive experiments can be carried out. The benefits of using sodium monophosphate as a reducing agent in the present disclosure are as below: first, sodium monophosphate is a common industrial product, which is cheap and easy to purchase; second, the reducing effect of sodium monophosphate is good, with low adding proportions and low decomposition temperatures, whereas other reducing agents such as carbon and active metals need very high temperatures and water before reducing components such as CO and hydrogen are generated; third, decomposed sodium phosphate can easily bond with $SiO_2$, and coking can occur at relatively low temperatures, so that volatilization of other volatile components can be reduced during the germanium volatilization period, thereby increasing the grade; fourth, it is easy to crack sodium monophosphate, and combustible and explosive gas will not be generated during use, which makes the use of sodium monophosphate safe and reliable.

After experiments, it is found that it is effective and practical to add sodium monophosphate to germanium deposits for increasing the germanium volatilization rate when a thermal reducing and volatilization process is used, and that compared with existing pyrogenic methods for extracting germanium, the germanium volatilization rate is remarkably increased and the germanium grade in the slag is remarkably decreased. Under the same conditions, the germanium volatilization temperature is lowered by 100° C.-200° C.; the germanium volatilization time is reduced; the cost of fuel and other production expenses are saved; the coking temperature of the slag is lowered by 100° C.-200° C.; and coking can occur more easily if the added proportion of sodium monophosphate is higher. The germanium volatilization rate exceeds 97% at a temperature of 1,000° C. and approximates 100% when the volatilization temperature is 1,100° C.

The chemical reaction formula explaining the principle of the present disclosure is as below:

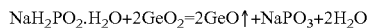

$$NaH_2PO_2 \cdot H_2O + 2GeO_2 = 2GeO\uparrow + NaPO_3 + 2H_2O$$

The present disclosure is suitable for germanium deposits including a germanium content of 0.010%-0.050%, an ash content of 40%-65%, a fixed carbon content of 18%-25%, a water content of 12%-18%, a calcium content of 2%-4%, a magnesium content of 0.2%-0.6%, an aluminum content of 2%-6% and a silicon content of 12%-16%. Such germanium deposits is low in colorific value and carbon content. Thus, industrial coal is needed to provide additional colorific value and reducing agents. The added sodium monophosphate is intended to reduce more complex $Ge^{4+}$ compounds using its strong reducing function.

In the method of adding a reducing agent of sodium monophosphate to germanium deposits for thermally reducing volatized germanium proposed by the present disclosure, the factors affecting the germanium volatilization rate include: the amount and proportion of the added sodium monophosphate, the baking temperature, the temperature increasing time of the Muffle furnace or the pyrogenic germanium extracting device, the amount of oxygen in the furnace and the volatilization time under a constant temperature.

The germanium content in the slag is reduced by increasing the germanium volatilization rate. When the germanium content in the slag left after volatilization is lower than 50 g/t, secondary recycling and treatment of the slag can be omitted, reducing industrial production inputs. Increase of the germanium volatilization rate means increase of the grade of germanium in the collected smog. This reduces industrial production inputs for germanium extraction using a hydrometallurgical process afterwards, reduces the dosage of hydrochloric acid and other auxiliary materials, reduces treatment to waste water and waste slag. Thus, the present disclosure proposes a method of adding a reducing agent to increase the germanium volatilization rate based on the original pyrogenic process. The method of the present disclosure does not need new equipment, does not need to renovate existing equipment, requires few changes to existing processes and operation procedures, generates less pollution to the environment and is safe to control. By using the method of the present disclosure, the germanium volatizing temperature can be reduced by 100° C.-200° C., reduce the germanium volatilization duration, save fuel and inputs of other production materials. The method of the present disclosure is an effective method for concentrating and extracting germanium using a pyrogenic process featured with simple procedure, high recycling rate, low energy consumption, simple operation and less labor input.

The present disclosure solves the following problems in the prior arts: existing pyrogenic methods for concentrating and extracting germanium from germanium deposits can hardly achieve a germanium recycling rate of greater than 75%; secondary pyrogenic recycling methods for extracting germanium slag have excessively high production cost and yield low germanium recycling rates; and the cost of hydrometallurgical treatment methods for low-grade germanium concentrates is too high.

The method of extracting germanium from a germanium deposit using a thermal reduction and volatilization process according to the present disclosure comprises the steps of:

Step 1): weighing a germanium deposit having a particulate diameter of less than 1 centimeter, weighing sodium monophosphate crushed to 120 meshes or more in an amount of 2.5%-7.5% by weight of the germanium deposit, dissolving the sodium monophosphate with water having a weight that is 0.1-0.5 times the weight of the germanium deposit to obtain a solution, and homogeneously mixing the solution to obtain a mixed germanium deposit; and Step 2): placing the mixed germanium deposit in a Muffle furnace or a pyrogenic germanium extracting device preheated to 900° C.-1,000° C., closing a door of the Muffle furnace or the pyrogenic germanium extracting device to isolate the mixed germanium deposit from air, after increasing a temperature in the Muffle furnace or the pyrogenic germanium extracting device to 1,000° C.-1,100° C., baking at a constant temperature for 1-2 hour(s) for volatilizing and concentrating so that germanium is concentrated in volatilized smog, and collecting the volatilized smog that enters into a smog-collecting bag to obtain a germanium concentrate.

After baking and volatizing are finished, the Muffle furnace or the pyrogenic germanium extracting device is cooled to room temperature. The volatized slag is weighed to calculate the loss on ignition of the germanium deposit. The remained slag is grinded to be 120 meshes or lower. The germanium grade of the remained slag is analyzed and detected, and the germanium volatilization rate is calculated.

The pyrogenic germanium extracting device is a device recorded in the Chinese patent No. CN 201320436249.8.

Advantageous Effects

The method of extracting germanium from a germanium deposit using a thermal reduction process with sodium monophosphate added according to the present disclosure has the following advantages over a traditional method of concentrating and extracting germanium using a pyrogenic process.

(1) A traditional method of concentrating and extracting germanium using a pyrogenic process requires secondary recycling of the slag, and needs to add and burn more industrial coal for heating the slag and volatizing germanium. By using the method according to the present disclosure, after adding and burning sodium monophosphate, when the baking temperature reaches 1,000° C. or more and the baking time is 1 hour or more, the germanium grade in the slag left after volatilization can be reduced to 50 g/t or less, so that secondary recycling of the slag is avoided and production cost is substantially saved.

(2) The germanium volatilization rate generated by a method of extracting germanium using a thermal reduction process with adding and burning sodium monophosphate is much higher than that generated by a method of extracting germanium using a direct burning process without adding and burning sodium monophosphate, and the germanium grade in the slag generated by the former method is much less than that generated by the latter. When the baking temperature is 1,100° C., the germanium volatilization rate generated by the former method with 2.5 wt % sodium monophosphate added is nearly 100%, while the germanium volatilization rate generated by the latter is only about 90%. When the baking temperature is 1,000° C., the germanium volatilization rate generated by the former method with 2.5 wt % sodium monophosphate added is 96% or more, while the germanium volatilization rate generated by the latter is only about 55%.

(3) Under the same conditions, the method according to the present disclosure can lower the germanium volatilization temperature by 100° C.-200° C., can reduce the germanium volatilization time, can save the cost of fuel and other production expenses, and can lower the coking temperature of the slag by 100° C.-200° C.

(4) Compared with the latter method, the method according to the present disclosure can increase the germanium grade in the collected smog due to increased germanium recycling rates, and can save the production cost of a followed method of concentrating and extracting germanium using a hydrometallurgical chloration and distillation process by saving dosages of hydrochloric acid and other auxiliary materials.

BRIEF DESCRIPTION OF THE DRAWINGS

FIG. 1 shows the flowchart of the process of the present disclosure.

DETAILED DESCRIPTION

Embodiment 1

The components of the raw materials are shown in Table 3.

TABLE 3

| | Components of the raw materials | | | | | | | | | |
|---|---|---|---|---|---|---|---|---|---|---|
| | Germanium/ % | Ash/ % | Fixed carbon/ % | Water/ % | Calcium/ % | Magnesium/ % | Aluminum/ % | Silicon/ % | Arsenic/ % | Phosphorous/ % |
| Germanium deposit | 0.0321 | 42.20 | 25.6 | 17.32 | 2.41 | 0.53 | 2.56 | 12.17 | 0.03 | 0.02 |

Step 1: weigh 10 tons of germanium deposits crushed to have a granularity of 1 cm or less and shown in Table 3; weigh 250 kg of sodium monophosphate (accounting for 2.5 wt % of the germanium deposits); add 1,000 kg water to dissolve the sodium monophosphate; and uniformly mix an obtained sodium monophosphate solution and the germanium deposits using a mixing machine.

Step 2: add the above mixture in the pyrogenic germanium extracting device preheated to 900° C. or above, wherein industrial coal with a thickness of 5 cm-8 cm is used as primer in the furnace; maintain the thickness of the coal layer to be 50 cm-70 cm; cover a layer of domestic coal on the germanium deposits; close the furnace door; increase airing to raise the temperature in the furnace to 1,000° C.-1,100° C. for baking and volatizing for 1 hour at a constant temperature; turn the coal layer 2-3 times to ensure complete burning during the baking and volatizing period; maintain a negative pressure state in the furnace by adjusting the flow rate of induced air during the baking and volatizing period, which may be performed by observing a pressure gauge or observing that flames do not come out of the furnace door.

Step 3: after the baking and volatizing period is completed, lower the temperature in the furnace to 500° C.; start a slag discharging device to discharge the slag; cool the slag to room temperature; weigh the slag to obtain a weight of 5.83 tons; and calculate the loss on ignition rate of the germanium deposits to be 42.10%.

Step 4: sample the slag left after volatilization; calculate the germanium grade in the slag left after volatilization to be 0.0021%; calculate the germanium volatilization rate of the germanium deposits to be 96.30%.

Embodiment 2

The components of the raw materials are shown in Table 2.

TABLE 2

| | Components of the raw materials | | | | | | | | | |
|---|---|---|---|---|---|---|---|---|---|---|
| | Germanium/ % | Ash/ % | Fixed carbon/ % | Water/ % | Calcium/ % | Magnesium/ % | Aluminum/ % | Silicon/ % | Arsenic/ % | Phosphorous/ % |
| Germanium deposit | 0.0448 | 59.9 | 18.68 | 15.2 | 3.42 | 0.39 | 3.00 | 14.97 | 0.04 | 0.03 |

Step 1: weigh 50 g of germanium deposits shown in Table 2 and put the germanium deposits in a cupel; weigh 2.5 g of sodium monophosphate (accounting for 5 wt % of the germanium deposits) and put the sodium monophosphate in a small beaker; take 25 mL of water to dissolve the sodium monophosphate; add an obtained sodium monophosphate solution to the germanium deposits sample; mix uniformly the monophosphate solution and the germanium deposits sample using a glass bar; take 10 mL of water to wash the small beaker and the glass bar, and add the used water to the germanium deposits sample; put the sample in a baking oven preheated to 90° C. for 30 minutes to evaporate water until the sample is almost dry.

Step 2: take the sample out of the baking oven; put the sample in a Muffle furnace preheated to 900° C.; and increase the temperature in the Muffle furnace to 1,000° C. for baking and volatizing at a constant temperature for 1 hour.

Step 3: after the baking and volatizing are completed, lower the temperature to 500° C.; take the cupel out of the Muffle furnace and cool the cupel to room temperature; weigh the baked slag left after volatilization to obtain a weight of 28.7 g; calculate a loss on ignition rate of the germanium deposits to be 42.6%; take out the slag and grind the same to be 120 meshes or above.

Step 4: take certain amount of the slag left after volatilization for analysis; and calculate a germanium grade of the slag left after volatilization to be 0.0033%; calculate the germanium volatilization rate of the germanium deposits to be 95.50%.

We claim:

1. A method of extracting germanium from a germanium deposit using a thermal reduction and volatilization process, comprising:
    Step 1): weighing a germanium deposit having a particulate diameter of less than 1 cm to obtain a weight of the germanium deposit, weighing sodium monophosphate crushed to 120 meshes or more in an amount of 2.5%-7.5% by weight of the germanium deposit, dissolving the sodium monophosphate with water at a weight that is 0.1-0.5 times the weight of the germanium deposit to obtain a solution, and uniformly mixing the solution with the germanium deposit to obtain a mixed germanium deposit; and
    Step 2): placing the mixed germanium deposit in a Muffle furnace or a pyrogenic germanium extracting device preheated to 900° C.-1,000° C., closing the Muffle furnace or the pyrogenic germanium extracting device to isolate the mixed germanium deposit from air, increasing a temperature in the Muffle furnace or the pyrogenic germanium extracting device to 1,000° C.-1,100° C., baking the mixed germanium deposit for 1-2 hour(s) for volatilizing and concentrating so that germanium is concentrated in volatilized smog, and collecting the volatilized smog that enters into a smog-collecting bag to obtain a germanium concentrate.

* * * * *